United States Patent [19]

Bolduc et al.

[11] Patent Number: 4,557,517

[45] Date of Patent: Dec. 10, 1985

[54] AERODYNAMIC ILLUMINATED SIGN

[75] Inventors: Richard M. Bolduc, 97 Union Ave., Old Orchard Beach, Me. 04064; Paul R. Lagarde, South Berwick, Me.

[73] Assignee: Richard M. Bolduc, Old Orchard Beach, Me.

[21] Appl. No.: 525,180

[22] Filed: Aug. 22, 1983

Related U.S. Application Data

[63] Continuation-in-part of Ser. No. 330,461, Dec. 14, 1981, abandoned.

[51] Int. Cl.$^4$ .............................................. B62D 35/00
[52] U.S. Cl. ...................................... 296/1 S; 40/592
[58] Field of Search ................ 40/564, 579, 591, 592, 40/204, 615; 362/61; 296/1 S

[56] References Cited

U.S. PATENT DOCUMENTS 4,087,124  5/1978  Wiley, Jr. ............................ 296/1 S
4,135,754  1/1979  FitzGerald et al. ................. 296/1 S
4,401,338  8/1983  Caldwell ............................. 296/1 S Primary Examiner—Richard A. Bertsch
Attorney, Agent, or Firm—William Nitkin

[57] ABSTRACT

An aerodynamic drag-reducing air deflector adapted to be mounted on a truck serving to display indicia illuminated from the rear comprising a planar clear plastic-like member on which is screened in reverse the indicia and which is formed to aerodynamic shape, said rear being further coated with a translucent coating. Another embodiment utilized for quick indicia interchangeability has a clear dome and a member carrying the indicia insertable behind the dome and easily replaced with another member with different indicia. In a further embodiment the dome may be mounted on a housing.

5 Claims, 5 Drawing Figures

AERODYNAMIC ILLUMINATED SIGN

This application is a continuation-in-part of our previously filed application, Ser. No. 330,461 filed 12/14/81 of the same title now abandoned.

BACKGROUND OF THE INVENTION

1. Field of the Invention

This invention relates to an apparatus for reducing the aerodynamic drag of a trailer truck or truck body above the cab of the vehicle attached to such body which structure is utilized as an illuminated sign for the display of a variety of indicia.

2. History of the Prior Art

Aerodynamic structures adapted for placement on truck bodies and trailer trucks above the cab are well known in the art. Examples of such are disclosed in Hersh, U.S. Pat. Nos. 4,021,069; Zelikovitz, 3,814,472; and Dempsey, 2,514,695. Attempting to reduce the aerodynamic drag of trailers or attached bodied trucks has been worked on by a number of people in various manners such as seen in Vaughn, U.S. Pat. No. 3,425,740 wherein the aerodynamic members are movable. The use of such members to reduce drag and increase the economy of the vehicle has become widespread and it is further desirable to utilize such members for advertising purpose. Such advertising associated with members on trucks is also well known and old in the art. For example, the illuminated sign of Kelly, U.S. Pat. No. 1,390,561 illustrates a sign member in front of a vehicle illuminated from the rear so that it displays the message written thereon to oncoming cars. Such signs may provide a variety of different messages such as seen in the patent to Wilson, U.S. Pat. No. 2,758,401 wherein the indicia for the left and right stop are displayed within such illuminated sign members. Also imprinting of advertising directly on truck bodies is well known and such advertising has even been utilized and affixed in such other places as on splash guards with advertising pockets as seen in the Goetz U.S. Pat. No. 3,241,857. The most pertinent patent in the prior art is FitzGerald, U.S. Pat. No. 4,135,754 wherein the aerodynamic enclosure on the truck body above the cab displays printed indicia which could be advertising material and the like which is illuminated from the rear inside the enclosure.

SUMMARY OF THE INVENTION

It is an object of this invention to provide an improved illuminated aerodynamic deflector for vehicles such as trucks and trailers of a type that is economical to produce, will stand up well under all environmental conditions and which gives a brighter illumination and more attractive appearance than the indicia-displaying deflectors of the prior art.

It is a further object of this invention to provide a deflector that can be easily adapted for use on all types of trucks and trailers regardless of the exact sizes thereof.

It is still a further object of this invention to provide a method of easily changing the indicia to be displayed.

When using the aerodynamic enclosures such as the one described herein, vehicles can significantly reduce the air resistance at highway speeds of the truck body or trailer and in doing so, less power is required and significant fuel savings can be incurred. In addition, to use such aerodynamic enclosure to advertise a product, company name or whatever is wished to be advertised is highly desirable.

It is a further object of this invention that the device be simple to install and be easily moved from one truck box to another. It should be noted that there is no ultraviolet fading that occurs as in some of the prior art.

In one embodiment of the device of this invention a clear sheet of polycarbonate or equivalent strong plastic-like material is cut to the desired size as will be described below for the vehicle or trailer on which it is to be used. The rear of the polycarbonate surface is silk-screened in reverse with the indicia desired such as a trademark, name, logo or the like with ink that is specially formulated to resist crazing and fracturing during the vacuum-forming process. The flat sheet of polycarbonate is placed in a forming machine. The sheet is then heated by means of infrared elements until such time as the material is ready to form. This can be accomplished using blowforming methods first by heating the sheet until such time as an infusion of air can be supplied to the lower side of the polycarbonate blowing the polycarbonate into the shape desired. A vacuum-forming method can also be utilized which has more accuracy as to shape, and there are other well-known methods of forming polycarbonates which can be used to form the aerodynamic deflector of this invention. After the sheet is formed into the specific shape, it is sprayed on the inside with specifically formulated translucent polycarbonate sign paint color in such a fashion as to allow lights which can be mounted on the front wall of the truck body or within the structure of this invention to shine forward to illuminate the entire enclosure, thereby accentuating the printed indicia against the contrasting background color. The advantages of this system is that the indicia is not exposed to the elements because it is inside the aerodynamic member and therefore is not susceptible to any cracking, fading or chipping as would occur if the indicia were printed on the front face of the aerodynamic enclosure. When built, the unit is extremely lightweight and strips of rubber foam are provided along the edges to provide noise insulation as well as weather insulation to prevent moisture and rain from being driven between the aerodynamic enclosure and the truck body. Access to the lights is through a port hole cut into a side of the deflector. The lighting assembly, a two-part bracket and slide unit, is affixed to the truck body. The slide, with the bulbs in their fixtures affixed thereto, is slideably removable through the side port. A cover with a sealing gasket is installed over the port to seal and protect the enclosure. The shape of the unit extends from somewhat below the top of the truck, to approximately 4 inches from each side edge and extends downward to a point in the vicinity of the top of the cab. The electricity to power the light bulbs of which there may be several on one or more slide bracket members can come from the electricity provided to the lights of the truck. A small area at the base of the aerodynamic enclosure at its contact point with the truck can be left open to allow any moisture or condensation formed therein to drain out. The shape of the aerodynamic deflector member can be a rectangular dome shape or any shape used for such purposes which is well-known in the prior art.

In another embodiment the original dome can have clips affixed to its inside to hold interchangeable sheets of indicia to be illuminated from the rear. A similar embodiment can be utilized without the clips by having the indicia sheet carry adhesive and be stuck directly to the inside or outside of the dome.

In yet another embodiment the original dome can be mounted on a rectangular housing having a flat, clear indicia-carrying plastic sheet insertable and removable through a side opening in the rectangular housing.

DESCRIPTION OF THE PREFERRED EMBODIMENT(S)

Figure 1:
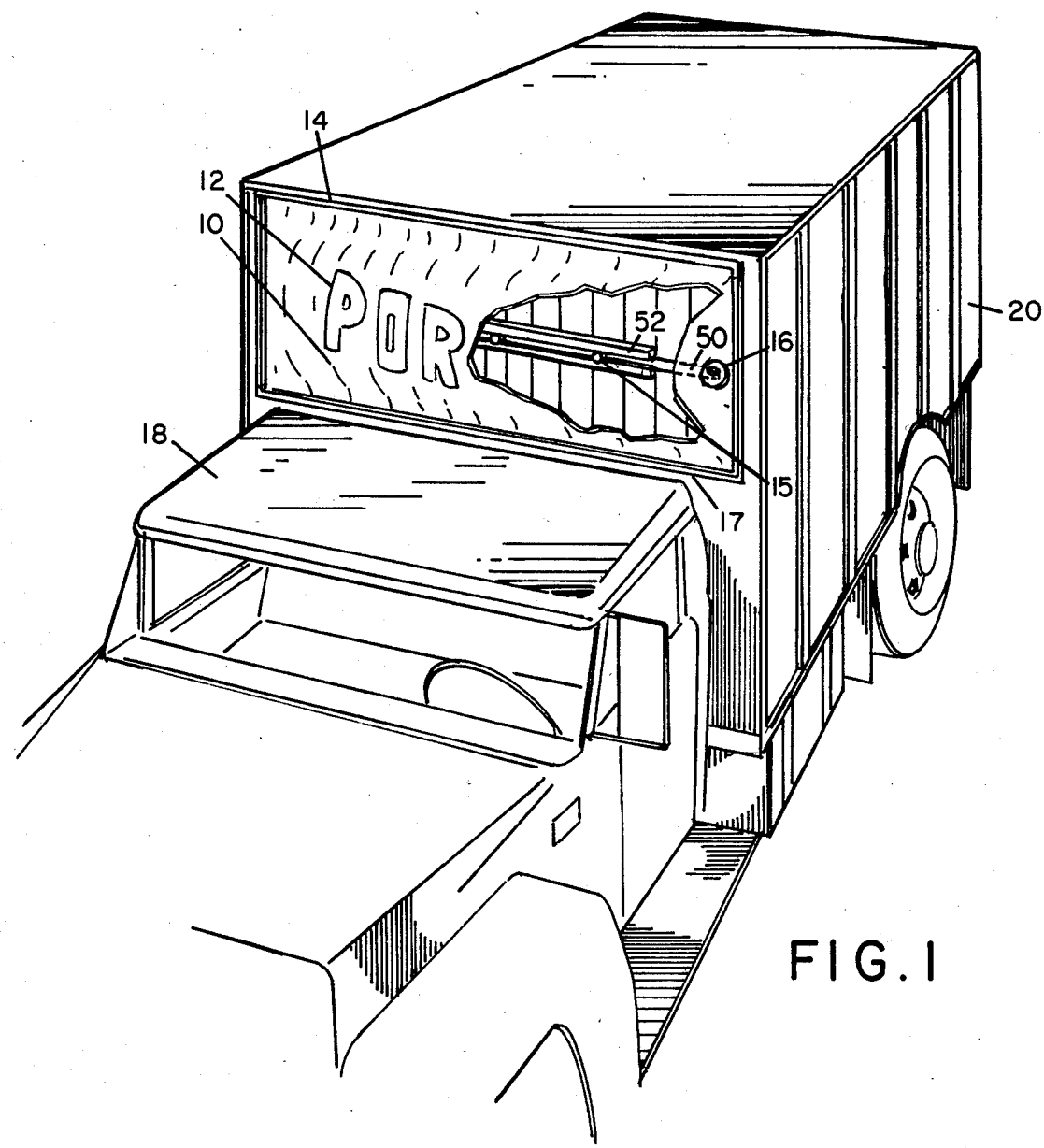
FIG. 1 illustrates a perspective view, with a cutaway section, of the device of this invention in use on a straight box vehicle.

FIG. 1 illustrates a perspective view of truck body 20 having cab 18 attached thereto. The device of this invention can be used on a separate trailer truck assembly or on any vehicle which has a flat forward-facing surface such as the front of truck body 20. Upon this truck body is mounted a polycarbonate dome 10 or equivalent strong plastic-like material which carries imprinted indicia 12. At the side of dome 10 can be port hole 16 through which slide bar 50 can be pulled out of bracket member 52 to allow for easy replacement of light bulbs 15. Around the edges of the dome can be metal retaining frame 17. By means of this frame the dome can be affixed to the body of the truck by fastening means 14 such as screws screwed through apertures in the edges of frame 17 into truck body 20. Slide bar 50 holds light bulbs 15 each in an electrical socket of which there can be any desired number in any special configuration, suited to provide interior illumination to all parts of the sign, which can be interconnected by wire to a power source which is usually the same electrical system which operates the other lights of the truck.

Figure 2:
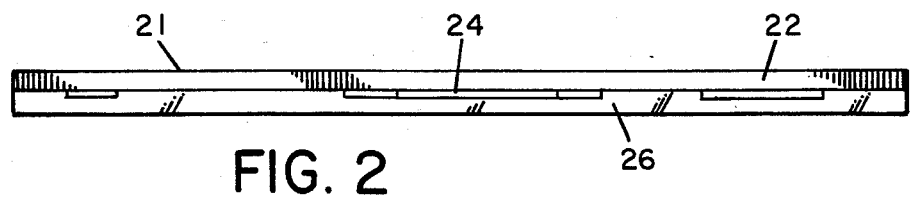
FIG. 2 illustrates a cross-sectional view of the device of this invention showing the layers utilized therein in one embodiment thereof.

Seen in FIG. 2 is a cross-sectional view of a section of dome 10. Seen in this view from front surface 21 is clear polycarbonate 22 of a thickness in the range of 1/16 inch to ¼ inch sufficient to withstand the expected air pressure against it. On the rear of polycarbonate 22 is screened in reverse indicia 24 seen in segments. A silk-screening ink such as Grip Flex FR-1 Series or equivalent can be used. The imprinting onto dome 10 can be done by any known silk-screening or equivalent process. The rear surface is then completely coated with a formulated polycarbonate sign paint coating 26 such as Gripflex FR-2 Series or equivalent in the translucent background color. This coating provides a contrasting background color. Allowance in the shape of the indicia must be made as the center portion of the dome expands more in the forming process than the portions near the side edges.

Figure 3:
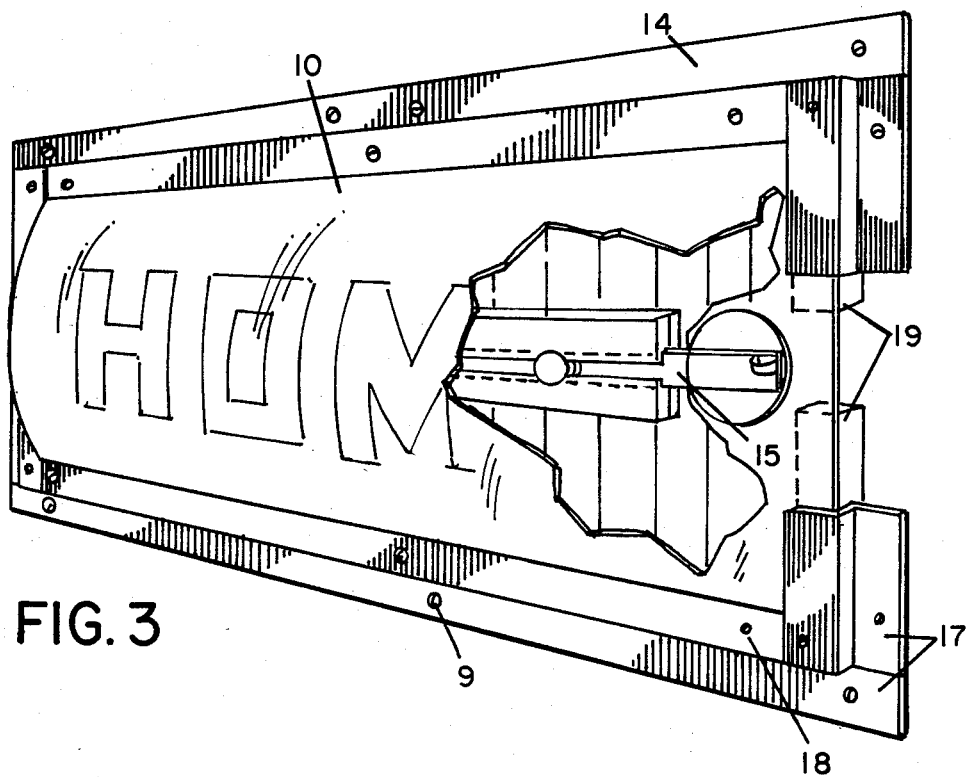
FIG. 3 illustrates a perspective view with a cutaway section showing one embodiment of the device of this invention.

FIG. 3 shows the embodiment of clear outer dome 10 on which is screened the indicia. Also illustrated in FIG. 3 is a method of affixing dome 10 to the truck. Frame retention members 17 are placed around the lip of the dome, securing the frame to the dome with machine screws 18 or equivalent fasteners. A rubber-like gasket 19 is adhered to the rear of the lip formed from the edges of the dome. The entire assembly is secured to the truck body with sheet metal screws 9 or equivalent fasteners screwed through apertures in the edges of retention frame 17 compressing gasket 19 thereby sealing and securing the unit to the truck body.

Figure 4:
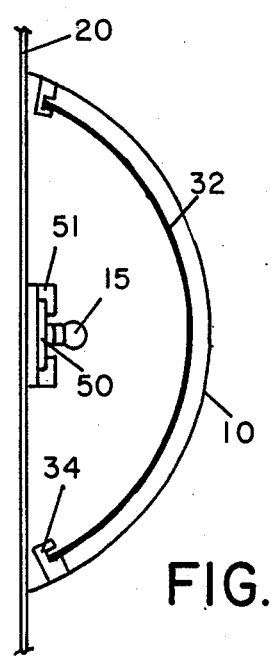
FIG. 4 illustrates a dome with clip members for holding an indicia sheet.

FIG. 4 shows a version wherein the inner indicia-carrying sheet 32 can also be affixed by clips 34 to the inside of transparent dome 10. Sheet 32 must be light transmittable around the indicia thereon.

Figure 5:
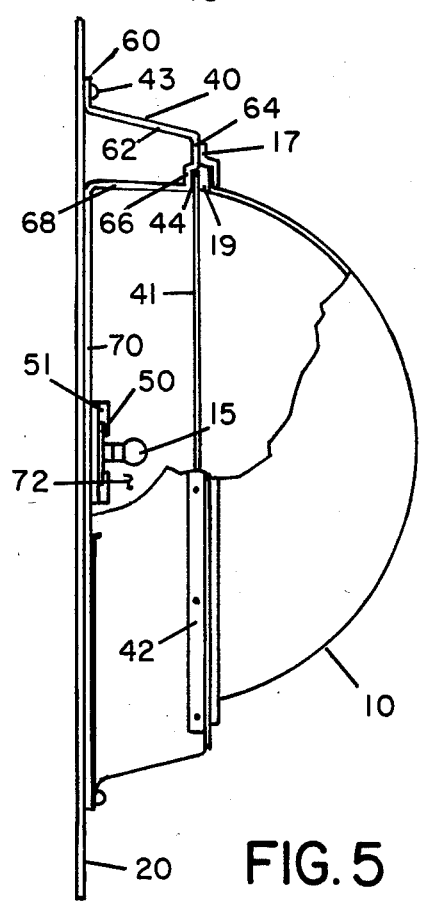
FIG. 5 illustrates a cutaway side view of the rectangular housing with clear dome and replaceable advertising sheet.

FIG. 5 shows a cross-section of an embodiment with a rectangular-shaped housing 40 vacuum-formed out of Rovel or equivalent material. The housing is formed with a lip 60, through which screws can be driven, adapted to rest against the front of truck body 20. Extending outward from lip 60 and inward at an angle is housing outer side 62. The angle of outer side 62 of housing 40 is important to continue the aerodynamic shape of dome 10. Outer housing side 62 extends to front member 64 which extends inward parallel to the front of the truck body. The inner section 66 of front member 64, being recessed, forms a groove 44. Housing 40 continues from the inside of recessed inner section 66 directly back to the truck body forming a wall 68 that is in line with the ends of dome 10. Wall 68 continues to back member 70 which extends completely around the base of housing 40 against the truck body. Affixed to the front of back member 70 is light bar assembly 51 which is of the bracket and slide configuration as described above in the description of FIG. 3. Port 72 partially shown in this view in one side of rectangular housing 40 allows slide bar 50 to be slid out therethrough for the changing of light bulbs 15. A cover, not illustrated, can be affixed over port 72 to seal the same from the elements when the light bar assembly is in its use position. On the front of housing 40 is affixed the assembly of FIG. 3. The housing is formed in such a manner as to allow for a plastic indicia-carrying sheet 41 to slide into grooves 44 between the dome assembly and the housing, which design allows for easily replacement of sheet 41. Dome 10 is a clear polycarbonate allowing for viewing of the indicia on sheet 41. Sheet 41 is reached and replaced by removing panel 42 allowing access along one side so that sheet 41 can be slid in or out. The entire assembly as shown in FIG. 5 can be secured to the truck box with screws 43 or equivalent. Sheet 41 must be light-transmittable around the indicia thereon.

In some embodiments the advertising sheet such as sheet 32 in FIG. 4 does not need clips to hold it behind dome 10 because the sheet itself may be coated with an adhesive and stuck directly to the inside or outside of dome 10. Such a sheet would not protrude too far to the edges of dome 10 so that its sides do not need to curve opposite its central vertical curve to match and mate that of dome 10.

Although the present invention has been described with reference to particular embodiments, it will be apparent to those skilled in the art that variations and modifications can be substituted therefor without departing from the principles and spirit of the invention.

I claim:

1. An improved rear illuminated indicia-carrying aerodynamic deflector for mounting on a truck body comprising:

a dome member formed with a lip therearound;
a lip formed around said dome member;
indicia imprinted on the inside of said dome;

a translucent coating applied over the inside of said dome covering said indicia and the remainder of the inside of said dome;

a retaining frame positioned around the lip of said dome;

means to affix said retaining frame to the lip of said dome;

a gasket member positioned around the rear of the lip of said dome;

said retaining frame adapted to be affixed to the front of said truck body;

means to retain said retaining frame and attached dome to the front of said truck body;

illumination means comprising;

a bracket member affixed to said truck body behind said dome having an open-fronted slot defined therein;

a slide bar adapted to slide in the slot of said bracket member;

a plurality of light members, each having light bulbs therein affixed to said slide bar;

means to carry electric current to said light members;

an aperture defined in the side of said dome aligned with said slide bar; and a covering adapted to be removably and replaceably affixed over said aperture, said slide member being adapted to slide through said aperture when said covering is removed carrying with it said light members causing them to pass out through said aperture to the exterior of said dome where said light bulbs can be replaced if desired, said slide member then being slid back in said bracket in said dome and said covering being reaffixed over said aperture.

2. An improved rear illuminated indicia-carrying aerodynamic deflector for mounting on a truck body comprising:

a clear dome member formed with a lip therearound;

a lip formed around said dome member;

a separate sheet of plastic-like material retained inside said dome;

light members;

indicia carried on said separate sheet and retained inside said dome between said dome and said light members;

a retaining frame positioned around the lip of said dome;

means to affix said retaining frame to the lip of said dome;

a gasket member positioned around the rear of the lip of said dome;

said retaining frame adapted to be affixed to the front of said truck body;

means to retain said retaining frame and attached dome to the front of said truck body;

illumination means comprising:

a bracket member affixed to said truck body behind said dome having an open-fronted slot defined therein;

a slide bar adapted to slide in the slot of said bracket member;

a plurality of light members, each having light bulbs therein affixed to said slide bar;

means to carry electric current to said light members;

an aperture defined in the side of said dome aligned with said slide bar; and a covering adapted to be removably and replaceably affixed over said aperture, said slide member being adapted to slide through said aperture when said covering is removed carrying with it said light members causing them to pass out through said aperture to the exterior of said dome where said light bulbs can be replaced if desired, said slide member then being slid back in said bracket in said dome and said covering being reaffixd over said aperture.

3. The device of claim 2 further including a pair of clip members adapted to hold said indicia-carrying sheet inside said dome.

4. The device of claim 2 wherein said indicia-carrying sheet further includes:

adhesive means on a face thereof by means of which said sheet is adhered to a face of said dome.

5. The device of claim 2 further including a housing member comprising:

an outer lip attachable to the front of said truck;

an outer side extending from said lip outward and inward from the front of said truck body;

a front member extending from said outer side inward parallel to the front of said truck body, having a recessed inner section defined therein;

an inner wall extending from said recessed inner section back to said truck;

a back wall extending from said inner wall along the front of said truck wherein said light members means are affixed to said back wall;

an aperture defined in an outer side of said housing and not in said dome for the passage of said slide bar for the replacement of light bulbs thereon;

a cover member removably and replaceably positioned over said aperture in said housing;

said dome and frame being affixable to said front member around of said recessed inner section defining a channel between said dome and said housing wherein said indicia-carrying sheet is adapted to be insertable into said channel between said dome and said housing in front of said light members; and means to cover said channel to hold said sheet in place and seal said structure, said means being removable and replaceable when it is desired to slide said indicia-carrying sheet out of said channel.

* * * * *